US009081990B2

(12) United States Patent
Elbaum et al.

(10) Patent No.: US 9,081,990 B2
(45) Date of Patent: Jul. 14, 2015

(54) PREVENTING UNAUTHORIZED DATA EXTRACTION

(75) Inventors: Reuven Elbaum, Haifa (IL); Zvi Shkedy, Karmiel (IL); Lior Amarilio, Yokneam (IL); Uri Bear, Pardes-Hana (IL); Yonatan Shlomovich, Givat Ada (IL); Chaim D. Shen-Orr, Haifa (IL); Yigal Shapiro, Zichron Yaakov (IL)

(73) Assignee: CISCO TECHNOLOGY, INC, San Jose, CA (US)

( * ) Notice: Subject to any disclaimer, the term of this patent is extended or adjusted under 35 U.S.C. 154(b) by 72 days.

(21) Appl. No.: 13/979,995

(22) PCT Filed: Nov. 16, 2011

(86) PCT No.: PCT/IB2011/055117
§ 371 (c)(1),
(2), (4) Date: Jul. 22, 2013

(87) PCT Pub. No.: WO2012/101485
PCT Pub. Date: Aug. 2, 2012

(65) Prior Publication Data
US 2013/0305372 A1    Nov. 14, 2013

Related U.S. Application Data

(60) Provisional application No. 61/461,983, filed on Jan. 26, 2011.

(30) Foreign Application Priority Data

Jan. 26, 2011   (GB) .................................. 1101282.0

(51) Int. Cl.
*G06F 12/14*    (2006.01)
*G06F 21/64*    (2013.01)
(Continued)

(52) U.S. Cl.
CPC .............. *G06F 21/64* (2013.01); *G06F 21/558* (2013.01); *G06F 21/79* (2013.01); *G11C 7/08* (2013.01); *G11C 7/1012* (2013.01); *G11C 7/24* (2013.01); *G11C 2207/002* (2013.01)

(58) Field of Classification Search
USPC .......................................................... 726/23
See application file for complete search history.

(56) References Cited

U.S. PATENT DOCUMENTS 4,896,301 A * 1/1990 Ogawa ..................... 365/230.03
5,835,956 A * 11/1998 Park et al. ..................... 711/167
(Continued)

FOREIGN PATENT DOCUMENTS

EP    1 383 132 A1    1/2004
EP    1 748 444 A1    1/2007
(Continued)

OTHER PUBLICATIONS

Nov. 16, 2011 Transmittal of International Search Report and Written Opinion of the International Searching Authority.
(Continued)

*Primary Examiner* — Amare F Tabor
(74) *Attorney, Agent, or Firm* — Husch Blackwell LLP

(57) ABSTRACT

An electronic device (22, 48, 50) includes an array (26) of memory cells, which are configured to store data values. One or more sense amplifiers (40) have respective inputs for receiving signals from the memory cells and are configured to output the data values corresponding to the received signals. Switching circuitry (36, 52) is coupled between the array of the memory cells and the sense amplifiers and is configured to receive an indication of a temporal pattern and to route the signals from the memory cells among the inputs of the sense amplifiers in accordance with the temporal pattern.

21 Claims, 3 Drawing Sheets

(51) Int. Cl.
*G11C 7/08* (2006.01)
*G11C 7/10* (2006.01)
*G11C 7/24* (2006.01)
*G06F 21/55* (2013.01)
*G06F 21/79* (2013.01)

(56) References Cited

U.S. PATENT DOCUMENTS

| | | | |
|---|---|---|---|
| 6,014,443 A * | 1/2000 | Mochizuki et al. | 713/193 |
| 6,317,375 B1 | 11/2001 | Perner | |
| 7,420,862 B2 | 9/2008 | Hummler | |
| 7,474,404 B2 | 1/2009 | VanWiggeren | |
| 7,623,376 B2 * | 11/2009 | Lee et al. | 365/185.03 |
| 7,702,934 B2 * | 4/2010 | Watanabe | 713/320 |
| 8,082,383 B2 * | 12/2011 | Suzuki et al. | 711/103 |
| 2005/0002523 A1 | 1/2005 | Sonnekalb | |
| 2009/0003108 A1 | 1/2009 | Somasekhar et al. | |
| 2009/0097328 A1 | 4/2009 | Kim | |
| 2013/0129083 A1 * | 5/2013 | Fujino | 380/29 |

FOREIGN PATENT DOCUMENTS

| | | |
|---|---|---|
| GB | 2 345 229 A | 6/2000 |
| WO | WO 2009/156881 A2 | 12/2009 |

OTHER PUBLICATIONS

May 27, 2011 Office Communication in connection with prosecution of GB 1101282.0.

* cited by examiner

PREVENTING UNAUTHORIZED DATA EXTRACTION

The present application is a §371 submission of International Application No. PCT/IB2011/055117, which was filed on 16 Nov. 2011, which was published in the English language on 2 Aug. 2012 with publication number WO 2012/101485, and which claims the benefit of the filing date of GB 1101282.0, filed 26 Jan. 2011 and U.S. Provisional Patent Application 61/461,983, filed 26 Jan. 2011.

FIELD OF THE INVENTION

The present invention relates generally to data security, and specifically to protection of electronic devices and data stored in such devices against unauthorized access.

BACKGROUND OF THE INVENTION

A variety of tools and methods are available for extracting information from electronic devices by sensing their internal signals. These tools and methods may be used by hackers to gain unauthorized access to secret information within such devices. In response, device manufacturers have developed techniques for impeding such attacks.

For example, U.S. Patent Application Publication 2005/0002523, whose disclosure is incorporated herein by reference, describes an apparatus is said to provide security against differential power analysis (DPA) attacks. The apparatus has a multiplexer with a control input, data inputs, and a data output for the encrypted mapped output value for through-connecting an encrypted data signal at one of the data inputs to the data output. The encrypted data signals for the data inputs of the multiplexer are provided based on an encryption key. A control signal indicating the output value to be mapped is applied to the control input of the multiplexer.

U.S. Pat. No. 7,420,862, whose disclosure is incorporated herein by reference, describes a data inversion device, which includes a differential amplifier having first and second input lines. A controller is coupled to selectively and individually decouple the first and second input lines from the differential amplifier.

PCT International Publication WO 2009/156881, whose disclosure is incorporated herein by reference, describes a method for hindering detection of information unintentionally leaked from a secret held in a memory unit. The memory unit is in a non-operational state during at least a first amount of time, after which a condition under which the memory unit operates changes, thereby causing the memory unit to enter an operational state. After waiting for a second amount of time, at least a second condition under which the memory unit operates is changed, thereby causing the memory unit to enter the non-operational state. Access to the secret information is enabled only during the second amount of time, and detection of secret information unintentionally leaked is limited during the first amount of time.

SUMMARY OF THE INVENTION

Embodiments of the present invention that are described hereinbelow provide techniques that can be useful in enhancing the tamper-resistance of electronic devices.

There is therefore provided, in accordance with an embodiment of the present invention, an electronic device, including an array of memory cells, which are configured to store data values. One or more sense amplifiers have respective inputs for receiving signals from the memory cells and are configured to output the data values corresponding to the received signals. Switching circuitry is coupled between the array of the memory cells and the sense amplifiers and is configured to receive an indication of a temporal pattern and to route the signals from the memory cells among the inputs of the sense amplifiers in accordance with the temporal pattern.

In some embodiments, the temporal pattern includes a random variation over time. Typically, the inputs of the one or more sense amplifiers are differential inputs, and the switching circuitry is configured to switch the inputs in accordance with the temporal pattern. Additionally or alternatively, the switching circuitry is configured to connect each sensing amplifier to two or more different columns of the memory cells in alternation according to the temporal pattern.

In a disclosed embodiment, the one or more sense amplifiers include multiple sense amplifiers, and the temporal pattern indicates different changes to be applied concurrently to the respective inputs of different ones of the sense amplifiers.

In one embodiment, the switching circuitry is coupled to receive the indication of the temporal pattern as a control input from a processor, which receives and rearranges the data values output by the sense amplifiers. Alternatively or additionally, the device includes a pattern output for providing the indication of the temporal pattern to a processor that receives and rearranges the data values output by the sense amplifiers.

There is also provided, in accordance with an embodiment of the present invention, an electronic system includes a memory device, as described herein. A processor is configured to receive the data values from the memory device and to rearrange the data values according to the temporal pattern.

There is additionally provided, in accordance with an embodiment of the present invention, a method for data protection, including providing an array of memory cells for storing data values and one or more sense amplifiers, which have respective inputs for receiving signals from the memory cells and are configured to output the data values corresponding to the received signals. An indication of a temporal pattern is received, and the signals from the memory cells are routed among the inputs of the sense amplifiers in accordance with the temporal pattern.

There is further provided, in accordance with an embodiment of the present invention, an electronic device, including an array of memory cells, which are configured to store data values. One or more sense amplifiers, each having one or more respective inputs for receiving signals from the memory cells, are configured to output the data values corresponding to the received signals. Switching circuitry is coupled between the array of the memory cells and the sense amplifiers and is configured to receive an indication of a temporal pattern and to route the signals from the memory cells to different ones of the inputs of the sense amplifiers in accordance with the temporal pattern. An indication of the pattern is communicated over a control link between the device and a processor, which receives and rearranges the data values output by the sense amplifiers.

The switching circuitry may be coupled to receive the indication of the temporal pattern as a control input from the processor via the control link. Additionally or alternatively, the control link may be operative to convey the indication of the temporal pattern from the device to the processor.

There is moreover provided, in accordance with an embodiment of the present invention, a method for data protection, which includes providing a memory device including an array of memory cells for storing data values and one or more sense amplifiers, each having one or more respective inputs for receiving signals from the memory cells and configured to output the data values corresponding to the received signals. An indication of a temporal pattern is communicated between the device and a processor, which receives and rearranges the data values output by the sense amplifiers. The signals are routed from the memory cells to different ones of the inputs of the sense amplifiers in accordance with the temporal pattern.

The present invention will be more fully understood from the following detailed description of the embodiments thereof, taken together with the drawings in which:

DETAILED DESCRIPTION OF EMBODIMENTS

A number of techniques have been developed for extracting information from memory interfaces inside integrated circuit devices. Some of these techniques involve probing and measuring electrical or optical signals (including photonic radiation) that are emitted from circuit components inside the integrated circuit. Such signals typically have low signal/noise ratios. These techniques may be used, for example, to find the values stored in the cells of a memory array by probing the values on the sense amplifiers that are connected to the array, as well as downstream circuit elements. Because the signals in question are weak, it is generally necessary to integrate or to repeat and average the measurements over a period of time in order to extract the signal from the noise.

The embodiments of the present invention that are described hereinbelow foil such measurements by rapidly changing the routing of bit lines to the sense amplifiers, even while the data values read from the memory cells do not change. For this purpose, switching circuitry is coupled between the memory cells and the sense amplifiers and switches the signals from the memory cells among the inputs of the sense amplifiers in accordance with a certain temporal pattern. The pattern changes the routing of the bit lines in such a way that repeated read operations from the same address in the memory at different times will result in different values being read out. The period of variation of this temporal pattern is typically short compared to the time needed to extract the signal measured by an external probe from the noise, and the pattern itself is kept inside the integrated circuit device, and not revealed outside the "system." Consequently, the sense amplifiers give outputs that are constantly changing over time, and measurements based on integration or averaging will give meaningless results. By switching the inputs to the sense amplifiers in this manner, the sense amplifiers and other downstream circuit elements (such as memory output buffers) are protected from unauthorized information extraction. Various types of temporal patterns that may be used for this purpose are described hereinbelow.

The temporal pattern is known, however, to a processor that receives the data output from the sense amplifiers, typically by communicating an indication of the pattern via a control link between the memory device and the processor. In some embodiments, the processor may provide the pattern as a control input to the switching circuitry via the control link. Additionally or alternatively, the control link may comprise an output from the memory device to the processor. The processor is therefore able to apply the pattern itself in order to rearrange the data.

Figure 1:
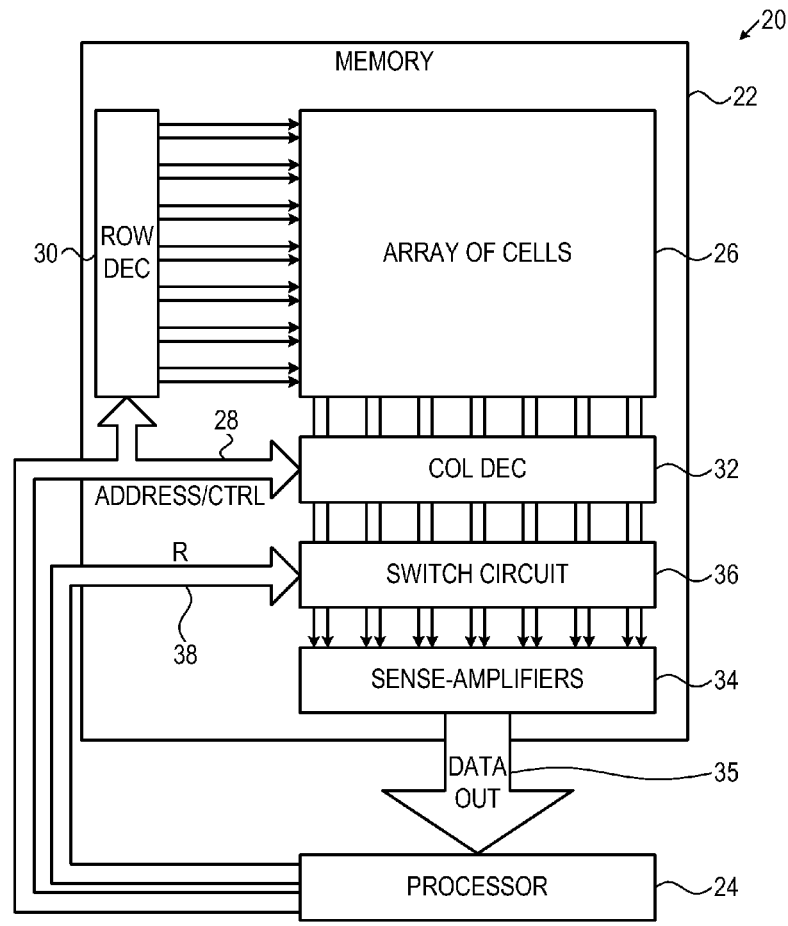
FIG. 1 is a block diagram that schematically illustrates an electronic system, in accordance with an embodiment of the present invention.

FIG. 1 is a block diagram that schematically illustrates an electronic system 20, in accordance with an embodiment of the present invention. The term "system" is used here to refer to substantially any type of electronic apparatus that may be subject to data security concerns, from micro-systems such as smart cards and disk-on-key devices, through television set-top boxes, desktop computers, servers, and other types of computerized apparatus. System 20 is simplified in the figure to show only certain components that are useful in understanding the operation of this embodiment.

System 20 comprises an electronic memory device 22, which communicates with a processor 24, such as an embedded or freestanding microprocessor or microcontroller or other logic device, such as a logic controller or state machine. Memory device 22 is typically implemented in a single integrated circuit. Although processor 24 is shown as a separate functional component from memory device 22, it may be implemented in the same integrated circuit as the memory device.

Memory device 22 comprises an array 26 of memory cells, which are typically arranged in rows and columns. The array may comprise substantially any type of volatile or non-volatile memory, such as random-access memory (RAM), read-only memory (ROM), or non-volatile RAM (NVRAM), including one-time programmable (OTP) memory and flash memory, with single-level or multi-level cells. To read from or write to a particular cell or range of cells, processor 24 inputs a suitable command to an address/control bus 28 in device 22, which passes the information to row and column decoders 30 and 32 of array 26, as is known in the art. For read operations, the data values stored in the selected cells are transferred to a data bus 35 via a readout circuit 34. The readout circuit comprises one or more sense amplifiers—typically one sense amplifier per column of array 26—which receive and amplify the signals from the memory cells and output the corresponding data values.

To prevent unauthorized extraction of the data stored in device 22 by probing of sense amplifiers 34 or bus 35 or other downstream circuit elements, processor 24 inputs an indication of a temporal pattern (R) via a control line 38 to a switching circuit 36, which is coupled between array 26 and the sense amplifiers in readout circuit 34. (The term "temporal pattern" is used in the context of the present patent application and in the claims to mean a pattern that varies over time.) Alternatively, the temporal pattern may be generated by another source, within or external to device 22, as long as processor 24 also receives an indication of the pattern. Switching circuit 36 receives the signals from the memory cells via column decoder 32 and switches the signals among the inputs of the sense amplifiers in accordance with the temporal pattern. As a result, when the data from a given address in array 26 are read out to the sense amplifiers in readout circuit 34 multiple times or over an extended period, the sense amplifiers will continually output different data values, changing constantly according to the temporal pattern R. As processor 24 is aware of the temporal pattern, however, it is able to rearrange and use the actual data values.

The temporal pattern R may be a random pattern (wherein the term "random" is used broadly to include both truly random and pseudo-random patterns) or a free-running toggle at a frequency that is unknown outside system 20. As noted earlier, the pattern switches the inputs to the sense amplifiers in such a way that repeated read operations from the same address in array 26 at different times result different read values on data bus 35. The pattern varies rapidly in time relative to the integration or averaging time of external probes that may be applied to device 22. Typically, pattern variation periods in the millisecond range are sufficient for this purpose, although longer or shorter periods may alternatively be used. R may comprise a single bit, whose alternating value over time causes switching circuit 36 to apply the same switching pattern to all the sense amplifiers in readout circuit 34. Alternatively, R may comprises a sequence of multi-bit words, which apply different switching patterns to different sense amplifiers and columns of array 26.

Figure 2:
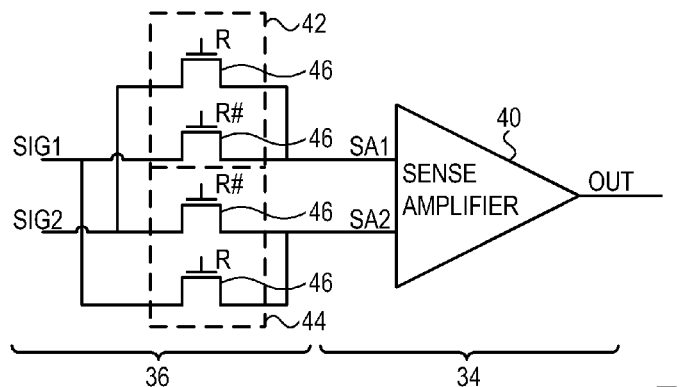
FIG. 2 is an electrical schematic diagram showing a sense amplifier with switchable polarity, in accordance with an embodiment of the present invention.

FIG. 2 is an electrical schematic diagram showing a sense amplifier 40 with switchable polarity, in accordance with an embodiment of the present invention. One or more sense amplifiers of this sort may be used in readout circuit 34. Sense amplifier 40 has a pair of differential inputs, labeled SA1 and SA2, each coupled to receive an input signal from a respective multiplexer 42, 44. These input signals, labeled SIG1 and SIG2, may be from the positive and negative bit lines of a column in array 26 (as is typical in RAM arrays), or they may be a bit line signal and a reference signal (as in typical ROM arrays), for example. Readout circuit 34 typically comprises an array of these sense amplifiers, one per column of memory array 26, or a single sense amplifier that serves multiple columns, or multiple sense arrays per column.

Each multiplexer 42, 44 comprises a pair of transistor switches 46, which receive the temporal pattern R and its inverse R# as control signals. When R=0, input SA1 receives signal SIG1, and SA2 receives SIG2; and when R=1, the inputs are reversed. As a result of toggling the inputs in this manner, the output of sense amplifier 40 will continually alternate between the actually data value that is read from the memory cell in question and its complement, with the variation tracking the temporal variation in R. As noted earlier, the same bit value of R may be applied to the inputs of all the sense amplifiers 40 in readout circuit 34, or alternatively, each sense amplifier or group of sense amplifiers may receive a different bit value.

Figure 3:
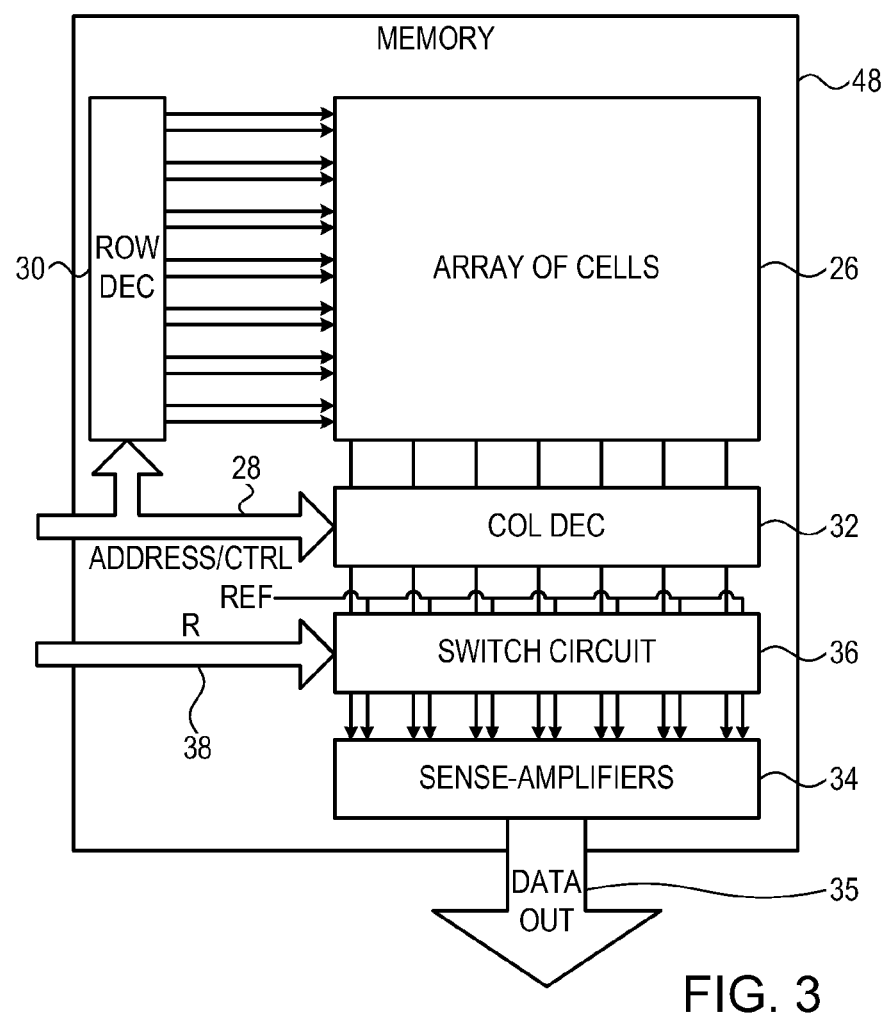
FIGS. 3 and 4 are block diagrams that schematically illustrate electronic memory devices, in accordance with other embodiments of the present invention.

FIG. 3 is a block diagram that schematically illustrates an electronic memory device 48, in accordance with another embodiment of the present invention. Device 48 is largely similar to device 22, and the corresponding elements in device 48 and are marked with the same indicator numbers as in FIG. 1. In device 48, however, each column of array 26 has only a single bit line, which is input to switching circuit 36 along with a common reference line, as shown in FIG. 3. Thus, the signals that are input in this case to multiplexers 42 and 44 (FIG. 2), SIG1 and SIG2, correspond to a given bit line and the reference.

Figure 4:
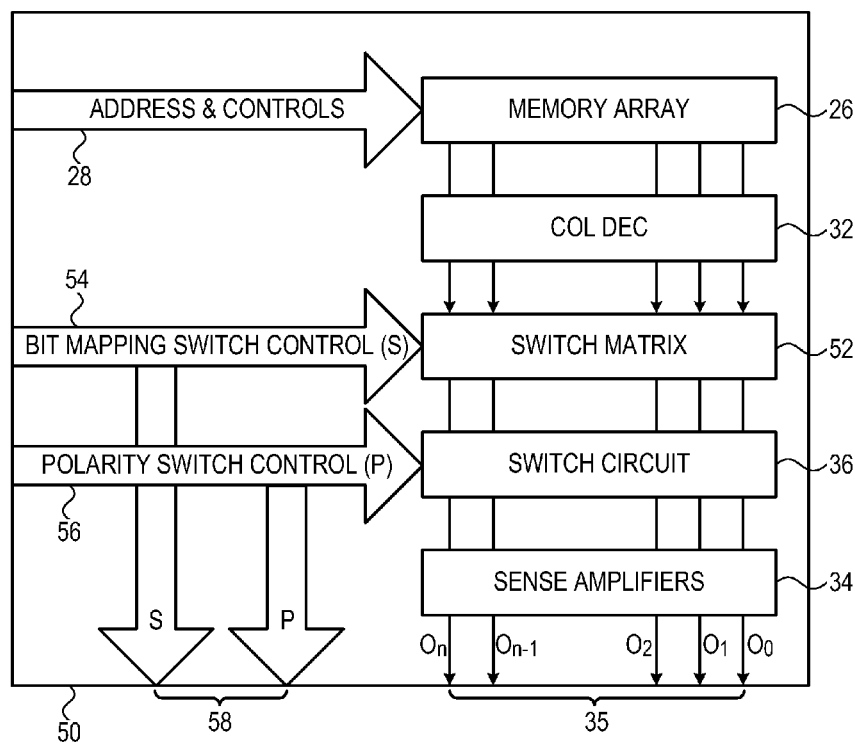

FIG. 4 is a block diagram that schematically illustrates an electronic memory device 50, in accordance with yet another embodiment of the present invention. Certain elements of device 50 are similar to the corresponding elements in device 22 and are marked with the same indicator numbers. The manner in which the inputs to sense amplifiers 40 in device 50 are switched, however, is more complex than that described above.

As shown in FIG. 4, the switching circuitry in device 50 comprises a switching matrix 52, which receives signals $D_0$, $D_1, \ldots, D_n$ from the respective columns of memory array 26 and interchanges these signals as inputs $S_0, S_1, \ldots, S_n$ to switching circuit 36. In other words, depending on a bit mapping switch control (S) input 54 to matrix 52, each signal $D_j$ may be passed in alternation to the corresponding input $S_j$ or to another input $S_k$, $k \neq j$. Additionally or alternatively, a polarity switch control (P) input 56 to switching circuit 36 switches the inputs to each sense amplifier 40 back and forth in a manner similar to that shown above in FIG. 2. (In practice, S and P may be input together as a combined temporal pattern indicator to switching matrix 52, but the functions are separated in FIG. 4 for the sake of clarity.) Thus, the respective output data values $O_0, O_1, \ldots, O_n$ from sense amplifiers 40 are constantly changing either in terms of their polarity or in terms of the bit order arrangement that they represent or both, depending on the values of S and P.

If necessary, device 50 may provide a pattern output 58 with the values of S and P for use in rearranging the data on bus 35. Alternatively, if the values of S and P are provided to device 50 by the same processor that receives and reads the data, output 58 may not be needed.

Although the above embodiments use particular sorts of circuits and switching patterns to switch the inputs to sense amplifiers 40, other circuits and patterns may be used to achieve similar ends, as will be apparent to those skilled in the art after reading the above description. All such alternative circuits and patterns are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An electronic device, comprising:
    an array of memory cells, which are configured to store data values;
    one or more sense amplifiers, each having a respective pair of differential inputs for receiving signals from the memory cells and configured to output the data values corresponding to the received signals;
    switching circuitry, which is coupled between the array of the memory cells and the sense amplifiers and is configured to prevent unauthorized extraction of the data values by switching the differential inputs of the sense amplifiers according to an indication of a temporal pattern that varies over time so that the data values output by the one or more sense amplifiers alternate between actual data values read from the memory cells and complements of the actual data values in accordance with the temporal pattern; and
    a control link over which an indication of the temporal pattern is communicated between the device and a processor, which receives and rearranges the data values output by the sense amplifiers.

2. The device according to claim 1, wherein the temporal pattern comprises a random variation over time.

3. The device according to claim 1, wherein the memory cells are arranged in multiple columns, and wherein the switching circuitry is configured to connect each sense amplifier to two or more different columns of the memory cells in alternation according to the temporal pattern.

4. The device according to claim 1, wherein the one or more sense amplifiers comprise multiple sense amplifiers, and wherein the temporal pattern indicates different changes to be applied concurrently to the respective inputs of different ones of the sense amplifiers.

5. The device according to claim 1, wherein the switching circuitry is coupled to receive the indication of the temporal pattern as a control input from the processor via the control link.

6. The device according to claim 1, wherein the control link is operative to convey the indication of the temporal pattern from the device to the processor.

7. The device according to claim 1, wherein the differential inputs of the one or more sense amplifiers are respectively connected, via the switching circuitry, to positive and negative bit lines of columns of the array.

8. The device according to claim 1, wherein one of the differential inputs of each of the one or more sense amplifiers is connected, via the switching circuitry, to a bit line of a respective column of the array while the other of the differential inputs is connected, via the switching circuitry, to a common reference line.

9. An electronic system, comprising:
a memory device, comprising:
an array of memory cells, which are configured to store data values;
one or more sense amplifiers, each having a respective pair of differential inputs for receiving signals from the memory cells and configured to output the data values corresponding to the received signals;
switching circuitry, which is coupled between the array of the memory cells and the sense amplifiers and is configured to prevent unauthorized extraction of the data values by switching the differential inputs of the sense amplifiers according to an indication of a temporal pattern that varies over time so that the data values output by the one or more sense amplifiers alternate between actual data values read from the memory cells and complements of the actual data values in accordance with the temporal pattern; and
a processor, which is configured to receive the data values from the memory device and to rearrange the data values according to the temporal pattern.

10. The system according to claim 9, wherein the temporal pattern comprises a random variation over time.

11. The system according to claim 9, wherein the memory cells are arranged in multiple columns, and wherein the switching circuitry is configured to connect each sense amplifier to two or more different columns of the memory cells in alternation according to the temporal pattern.

12. The system according to claim 9, wherein the one or more sense amplifiers comprise multiple sense amplifiers, and wherein the temporal pattern indicates different changes to be applied concurrently to the respective inputs of different ones of the sense amplifiers.

13. The system according to claim 9, wherein the processor is coupled to provide the indication of the temporal pattern as a control input to the switching circuitry.

14. The system according to claim 9, wherein the memory device comprises a pattern output for providing the indication of the temporal pattern to the processor.

15. A method for data protection, comprising:
storing data values in a memory device comprising memory cells and one or more sense amplifiers, each of the one or more sense amplifiers having a respective pair of differential inputs for receiving signals from the memory cells and configured to output the data values corresponding to the received signals;
communicating an indication of a temporal pattern between the device and a processor, wherein said temporal pattern is a pattern that varies over time;
preventing unauthorized extraction of the data values by switching the signals from the memory cells between the differential inputs of the sense amplifiers so that the data values output by the one or more sense amplifiers alternate between actual data values read from the memory cells and complements of the actual data values in accordance with the temporal pattern; and
on the processor, receiving and rearranging the output by the sense amplifiers in accordance with the temporal pattern.

16. The method according to claim 15, wherein the temporal pattern comprises a random variation over time.

17. The method according to claim 15, wherein the memory cells are arranged in multiple columns, and switching the signals comprises coupling each sense amplifier to two or more different columns of the memory cells in alternation according to the temporal pattern.

18. The method according to claim 15, wherein the one or more sense amplifiers comprise multiple sense amplifiers, and wherein the temporal pattern indicates different changes to be applied concurrently to the respective inputs of different ones of the sense amplifiers.

19. The method according to claim 15, wherein communicating the indication comprises receiving a control input in the memory device from the processor.

20. The method according to claim 15, wherein communicating the indication comprises providing the indication of the temporal pattern from the memory device to the processor.

21. An apparatus for data protection comprising:
means for storing data values in a memory device comprising memory cells and one or more sense amplifiers, each of the one or more sense amplifiers having a respective pair of differential inputs for receiving signals from the memory cells and configured to output the data values corresponding to the received signals;
means for communicating an indication of a temporal pattern between the device and a processor, wherein said temporal pattern is a pattern that varies over time;
means for preventing unauthorized extraction of the data values by switching the signals from the memory cells between the differential inputs of the sense amplifiers so that the data values output by the one or more sense amplifiers alternate between actual data values read from the memory cells and complements of the actual data values in accordance with the temporal pattern; and
means for receiving and rearranging the output by the sense amplifiers in accordance with the temporal pattern.

* * * * *